Oct. 28, 1947.  R. H. WINTERS  2,429,785
APPARATUS FOR PEELING ROOT VEGETABLES AND FRUIT
Filed Jan. 27, 1945
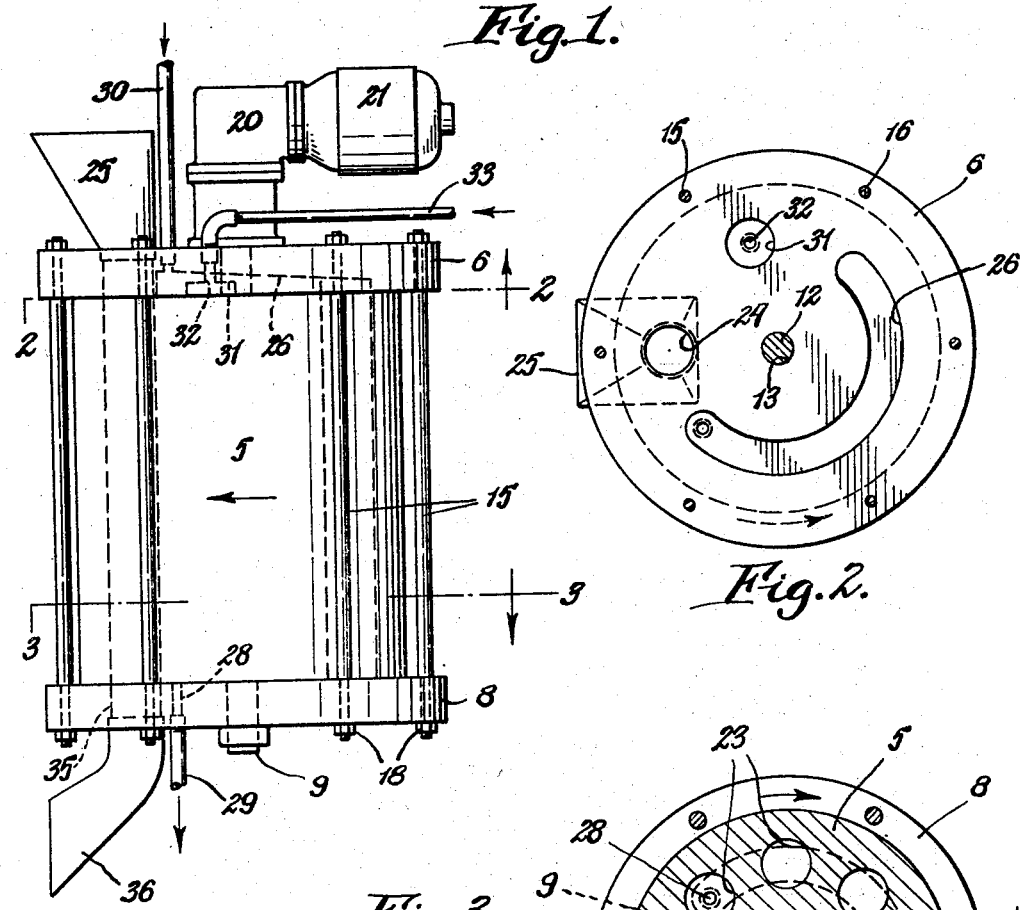
Fig. 1.
Fig. 2.
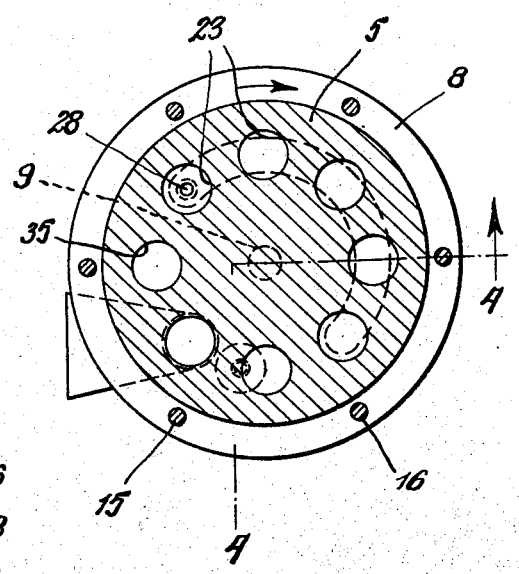
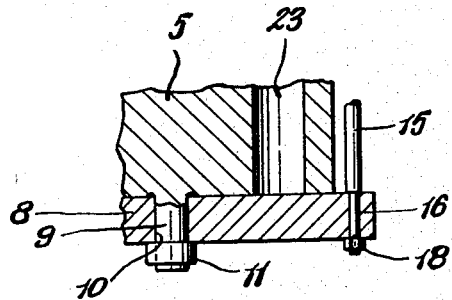
Fig. 3.
Fig. 4.
INVENTOR.
Russell H. Winters
BY
Popp and Popp
Attorneys Patented Oct. 28, 1947

2,429,785

UNITED STATES PATENT OFFICE 2,429,785

APPARATUS FOR PEELING ROOT VEGETABLES AND FRUIT

Russell H. Winters, Green Bay, Wis., assignor to The Larsen Company, Green Bay, Wis.

Application January 27, 1945, Serial No. 574,925

10 Claims. (Cl. 146—43)

This invention relates to apparatus for peeling root vegetables, such as carrots, onions, potatoes, rutabagas, beets and turnips and also similar dense and solid bodied, tight skinned fruit, such as apples, and more particularly to such apparatus in which the skin of such root vegetables or solid bodied, firm skinned fruit is exploded free from the body of the same by the sudden release of steam pressure developed under the skin.

In peeling fresh root vegetables, such as carrots, onions, potatoes, rutabagas, beets and turnips, as now practiced, a large proportion of the body of the vegetable is removed with the skin, this proportion being from 20 to 26 percent of the body of the vegetable. The same also applies to fruit, such as apples, which is similar in structure to such root vegetables in that they have hard or dense and solid bodies and tight firm skins. This, of course, results in a direct waste of this proportion of the money and labor expended in planting, fertilizing, cultivating and harvesting these root vegetables and fruit, as well as the cost and labor of transporting them to the cannery and preparing them for peeling. All of such root vegetables and fruit have a distinct skin which is relatively thin compared to the whole vegetable or fruit and which is all that is required to be removed in order to place these root vegetables and fruit in acceptable condition for cooking and canning or otherwise preserving.

In accordance with the present invention such root vegetables and fruit are peeled by exploding their skins free from their bodies by the sudden release of steam pressure developed under the skin. It has heretofore been proposed to remove the skins of relatively loose skinned vegetables, such as tomatoes, by exploding these relatively loose skins from the tomatoes, but, so far as I am aware, no successful apparatus has been developed for peeling tight skinned, solid and dense bodied fresh or unprocessed root vegetables or fruit, such as carrots, onions, potatoes, rutabagas, beets, turnips and apples by the generation and release of steam pressure under their skins.

I have also found that root vegetables and dense, solid bodied, firm skinned fruit, when peeled according to the present invention, possess extraordinary resistance to discoloration when exposed to the air, such discoloration or pigmentation being due to the presence of oxidative ferments or enzymes in the tissue and which are oxidized when exposed to the air.

It is accordingly the principal object of the present invention to provide apparatus for removing the skins of solid, dense bodied, tight skinned root vegetables and fruit in their natural state, such as carrots, onions, potatoes, rutabagas, beets, turnips and apples without removal of any substantial part of the bodies of these vegetables, thereby to materially reduce the cost of such root vegetables and fruit in canning or otherwise preserving the same.

A further object is to provide apparatus in the operation of which that part of the skin which forms creases or other skin irregularities, as in carrots, is removed with the skin and in which eyes, as with potatoes, are completely removed with the skin.

Another object is to provide such an apparatus which is adapted to continuous processing, that is, in which a continuous stream of the fresh root vegetables or fruit is received, peeled and discharged.

Another object is to provide such apparatus which is adapted for use with fresh root vegetables or fruit immediately after harvest, as well as with root vegetables or fruit which have been in storage for months.

Another aim is to provide such an apparatus which is low in cost both as to the cost of the equipment involved and the cost of operating the equipment.

Another purpose is to provide such apparatus which is not highly critical in operation and which does not require a highly skilled operator for supervision.

Another object of the invention is to provide such apparatus which is rapid in action and which leaves the product in a clean and entirely acceptable condition for slicing, dicing, canning in whole form or otherwise processing preliminary to being filled into cans or otherwise preserving the same.

Another object is to provide such apparatus the operation of which does not cook the vegetables or fruit or otherwise alter the taste or appearance of the freshly peeled vegetables or fruit.

Another feature of the invention resides in the extraordinary resistance of solid bodied, tight skinned root vegetables and fruit, particularly potatoes and apples, to discoloration after having been peeled in accordance with the present invention.

Other objects and advantages will appear from the following description and drawings in which:

Fig. 1 is a side elevational view of apparatus for peeling fresh root vegetables and solid bodied, tight skinned fruit in accordance with the present invention.

Fig. 2 is a horizontal cross section, taken on line 2—2, Fig. 1, looking upwardly.

Fig. 3 is a horizontal cross section, taken on line 3—3, looking downwardly.

Fig. 4 is a fragmentary vertical radial section through the lower part of the apparatus, this section being taken on line 4—4, Fig. 3.

The continuous peeling of tight skinned fresh root vegetables, such as carrots, onions, potatoes, rutabagas, beets and turnips or solid bodied, tight skinned fruit, such as apples, is effected by the simple apparatus shown which comprises a cylindrical rotor 5 arranged to rotate on a vertical axis and having end faces which are preferably ground to lie in a plane exactly perpendicular to the axis of the rotor and which are engaged by an upper circular stationary end head 6 and a lower circular stationary end head 8. The rotor 5 is shown as held in coaxial relation to the end heads or stators 6, 8 by a stub shaft 9 extending axially downward from the rotor through a bore 10 provided in the lower stator or end head 8 and carrying a fastening member 11, and by a drive shaft 12 extending axially upward from the rotor through a bore 13 provided in the upper stator or end head 6.

The end heads or stators 6, 8 are shown as being of larger diameter than the cylindrical rotor 5 and are held in proper axial relation to each other and to the rotor by an annular series of tie rods or stay bolts 15. The central part of each of these tie rods or stay bolts is preferably of relatively large diameter to space the end heads or stators and each is provided at its opposite ends with threaded studs 16 which extend through corresponding bores provided in the peripheral part of the end heads and are secured by nuts 18.

The drive shaft 12 extends upwardly through a gear reducer the casing 20 of which is suitably mounted on the upper end head or stator 6 and is driven through this gear reducer by an electric motor 21. The rotor 5 is shown as driven clockwise as viewed in Fig. 3 and as indicated by the arrows associated with the figures.

The cylindrical rotor 5 is shown as being made of a solid piece of metal although it could, for lightness, obviously be fabricated. The rotor is provided with an annular series of bores 23 extending axially therethrough in centered relation to the axis of the rotor, these bores being of sufficient size to form enclosures or chambers for the reception of a quantity of the root vegetables or fruit to be peeled. These bores or chambers 23 are successively filled with the whole root vegetables or fruit to be treated as the cylindrical rotor 5 is so being rotated by the electric motor 21. For this purpose the upper stator or end head 6 is provided on one side with an opening 24 which successively registers with the upper ends of the bores 23 as the rotor 5 rotates and an inlet hopper 25 is mounted on the end head 6 over this opening 24. The root vegetables or fruit to be peeled are supplied to the inlet hopper 25 in any suitable manner and it will be seen that as the rotor 5 rotates a charge of these root vegetables or fruit will be dropped into each passing bore 23 to form a column therein, the lower head 8 being blind directly below the filling opening 24 of the upper head 6 to form a stop.

As each filled bore 23 passes beyond the filling opening 24, the upper head or stator 6 operates to level off the column of root vegetables or fruit in the bore 23 to the height of this bore and to seal the upper end of this bore so as to provide a treating chamber closed at its opposite ends. As each filled bore continues in its passage from the filling opening 24 it comes into register with a semicircular steam manifold in the form of a groove 26 provided in the underside of the upper stationary end head 6 concentric with its axis so that the filled bores 23 communicate with this steam manifold for approximately one-half of a revolution of the rotor 5. As each filled bore 23 comes into register with the lead end of the steam manifold 26, it also comes into register with an exhaust port or passage 28 extending through the lower stationary end head 8 and leading to an exhaust pipe 29 which extends downwardly from the lower head 8. Steam under pressure is supplied to the manifold 26 from a steam pipe 30 and it will be seen that by initially opening a filled bore 23 at its upper end to this steam manifold and at its lower end to the exhaust port 28, the air in this bore 23 will be driven downwardly and out of the exhaust port 28 by the steam entering this bore from the steam manifold 26 so that each bore 23 is completely filled with steam. Each bore 23 passes out of register with the exhaust port 28 while maintaining communication with the steam manifold 26 and it will be seen that when this occurs steam pressure is built up in each bore 23 to the pressure of the steam supplied to the manifold 26, this pressure being maintained until converted into a vacuum by condensation thereof.

To so convert the steam pressure suddenly into a vacuum, after each bore 23 passes beyond the trailing end of the steam manifold 26 it comes into register with a recess 31 in the underside of the upper head 6, this recess being provided with a central aperture 32 through which cold water is sprayed downwardly into each passing bore 23 from a spray water pipe 33. The cold water so sprayed from the aperture 32 into each passing bore 23 serves to condense the steam therein and rapidly build up a vacuum.

After each bore 23 passes out of register with the spray water recess 31 it passes into register with an outlet opening 35 in the bottom head 8, this outlet opening 35 being at least as large as each bore 23 and extending through the bottom head 8 so that when this register is effected the entire column of root vegetables or fruit in the bore 23 drops by gravity through this oulet opening 35 into a discharge chute 36 or the like.

The steam pressure and the time of treatment under steam pressure must be adjusted, as hereinafter set forth in detail, depending upon the kind of fruit or vegetable being peeled, that is, whether onions, carrots, potatoes, turnips, rutabagas, beets, or apples and also depending upon the degree of freshness thereof, that is, whether taken directly from the field or orchard or whether taken from storage. With the steam pressure properly adjusted and with the rotor 5 driven at the speed to provide the required timing, the operation of the apparatus is as follows:

As each empty bore 23 of the rotor 5, which is revolving clockwise as viewed in Fig. 3, comes into register with the filling opening 24 through the upper stationary head 6, a charge of the root vegetables or fruit to be peeled is dropped from the inlet hopper 25 into this bore. The column of vegetables or fruit so dropped into this bore 23 is stopped by the opposing blank face of the lower stationary head 8 and as the bore 23 passes out of register with the filling opening 24 the top of this column is leveled off to the height of the bore 23.

As the newly filled bore 23 continues in its passage it comes into register with the leading end of the steam manifold 26 in the underside of the upper head 6 and also into register with the exhaust port 28 in the lower stationary head 8. In consequence steam from the steam pipe 30 and steam manifold 26 enters this bore 23, the air therein being driven out through the exhaust port 28 and exhaust pipe 29. When this filled bore 23 passes out of register with the exhaust port 28, the steam pressure in the filled bore 23 builds up to the steam pressure in the steam manifold, this steam pressure being regulated as hereinafter set forth. This steam pressure is maintained as long as the communication between this bore 23 and the steam manifold 26 is continued, the length of time of this pressure treatment also being regulated as hereinafter set forth.

By subjecting the fruit or vegetables in each bore 23 to steam of the pressure and for the length of time hereinafter prescribed, the moisture immediately below the surface of the skin of the fruit or vegetables is raised to approximately the temperature of the surrounding steam at the prevailing pressure. When each bore 23, filled with steam, and with the root vegetables or fruit having the temperature of the moisture beneath the skin thereof raised to a corresponding high temperature, is brought into the zone of action of the water spray from the spray orifice 32, the steam in the bore is immediately condensed and the pressure in the bore 23 immediately reduced to a vacuum. At this reduced pressure the subcutaneous moisture in the vegetables immediately vaporizes and blows or explodes the skin off the bodies of the vegetables or fruit. The skin so blown off carrots, potatoes, rutabagas, beets, onions, turnips and apples is very thin as compared with the body thereof, and is blown off in large pieces which adhere to adjacent peeled bodies but is readily freed. In the case of carrots the removed skin includes that part of the skin which contains deep creases and in the case of potatoes it includes the eyes. The enumerated root vegetables and fruit peeled according to the invention are satisfactorily peeled for all canning or preserving purposes and are in acceptable condition for canning or preserving whole, in segments, diced or in any other form.

Conditions of time and temperature which must be observed both with respect to the particular kind of vegetable or fruit being peeled and also with respect to the degree of freshness of the vegetable. With vegetables which are freshly harvested the time of treatment is substantially the same for all root vegetables as above enumerated. However, entirely different conditions of steam pressure during treatment must be maintained. With the enumerated root vegetables which are peeled after having been stored for a period of time, some require greater time of steam treatment, some require treatment at higher steam pressures and some require both. The following is a table of the optimum time of steam treatment and steam pressures employed with the different root vegetables enumerated when freshly dug; when peeled one week after harvest; and when peeled after six months' storage. The steam pressures referred to are gage pressures.

| Vegetable | Fresh | | One week after harvest | | After 6 months' storage | |
| --- | --- | --- | --- | --- | --- | --- |
| | Time in seconds | Steam pressure | Time in seconds | Steam pressure | Time in seconds | Steam pressure |
| Onions | 6 | 50 | 6 | 60 | 6 | 80 |
| Carrots | 6 | 60 | 8 | 60 | 8 | 80 |
| Potatoes | 6 | 40 | 8 | 40 | 8 | 80 |
| Turnips | 6 | 80 | 6 | 80 | 10 | 80 |
| Rutabagas | 6 | 80 | 6 | 80 | 10 | 80 |
| Beets | 6 | 80 | 6 | 80 | 10 | 80 |

With apples the time of treatment is in the order of 5 seconds with the steam pressure in the range of from 90 to 110 pounds gage, the pressure employed, in this range, being determined by the maturity and texture of the apples as well as the length of time the apples have been held in storage after harvesting.

By peeling root vegetables or dense, solid bodied, tight skinned fruit, such as apples, a substantial saving is effected due to the elimination of the waste of the body of the root vegetables or fruit which is incident to mechanical peeling. Thus, the peeling loss is less than 6 percent as compared with peeling losses of from 20 to 26 percent by previous abrasive or mechanical methods.

I have further discovered that root vegetables or solid bodied, firm skinned fruit peeled in the present apparatus are highly resistant to discoloration in exposure to the air. Particularly with potatoes and apples, fruit and vegetables peeled by friction, knife or chemical means, are rapidly discolored on brief exposure to ordinary atmospheric conditions existing within the canning factor room area. This discoloration is due to the oxidation of the freshly cut tissue, such pigmentation being due to the presence of oxidative ferments or enzymes in the tissue. Root vegetables and solid bodied, tight skinned fruit, when peeled in the present apparatus, are not subject to such discoloration on exposure to the atmosphere. For example, several varieties of apples have been peeled in accordance with the present invention and then exposed to the ordinary atmosphere of the cannery. The peeled apples so exposed have withstood the discoloration so characteristic of this fruit for a period of four days. At the time these peeled apples were discarded, they were not discolored but were withered and in some instances were soured due to bacterial action. The same resistance to pigmentation due to oxidation has been noted for potatoes and other root vegetables.

From the foregoing it will be seen that the present invention provides a marked economy in the cost of canning or preserving root vegetables, such as onions, carrots, potatoes, turnips, rutabagas and beets, as well as solid, dense bodied, tight skinned fruit, such as apples, in that only the relatively thin skin of these root vegetables and fruit is removed and the entire body of the vegetable or fruit retained. Further, peeling in the present apparatus is rapid, free from operating difficulties, is effected as a substantially continuous process and leaves the root vegetables or fruit in attractive and edible form ready for any desired further processing, all eyes and deep creases in particular being removed.

I claim as my invention:

1. Apparatus for peeling the bodies of vegetables and fruit of the character described, comprising a rotor having a plurality of tubular chambers extending axially therethrough and spaced an equal distance from the axis thereof, a stationary end head at each end of said rotor and adapted to enclose said chambers, means for rotating said rotor, one of said end heads having an inlet opening adapted to register successively with said chambers to admit a quantity of said bodies therein, means forming a steam manifold in one of said end heads to admit steam to said chambers as they pass beyond said inlet opening, means for admitting steam to said manifold at a pressure to raise the temperature of the subcutaneous moisture of said bodies in the chambers in communication therewith to approximately the temperature of said steam, means for spraying water through one of said end heads into said chambers after passing beyond said manifold to condense said steam and create a vacuum therein to vaporize said subcutaneous moisture and to explode the skins from said bodies, and means for removing said bodies through an outlet opening provided in one of said end heads in immediate advance of said inlet opening.

2. Apparatus for peeling the bodies of vegetables and fruit of the character described, comprising a rotor rotating about a vertical axis and having a plurality of vertical tubular chambers extending axially therethrough and spaced an equal distance from said axis, means for rotating said rotor, a stationary end head at each end of said rotor and adapted to enclose said chambers, the upper end head having an inlet opening adapted to register successively with said chambers to admit, by gravity, a quantity of said bodies therein, means forming a steam manifold in one of said end heads to admit steam to said chambers as they pass beyond said inlet opening, means for admitting steam to said manifold at a pressure to raise the temperature of the subcutaneous moisture of said bodies in the chambers in communication therewith to approximately the temperature of said steam, and means for spraying water through one of said end heads into said chambers after passing said manifold to condense said steam and create a vacuum therein to vaporize said subcutaneous moisture and to explode the skins from said bodies, said lower end head being provided with an outlet opening immediately in advance of said inlet opening through which the peeled bodies in each chamber fall by gravity.

3. Apparatus for peeling the bodies of vegetables and fruit of the character described, comprising a rotor having a plurality of tubular chambers extending axially therethrough and spaced an equal distance from the axis thereof, means for rotating said rotor, a stationary end head at each end of said rotor and adapted to enclose said chambers, one of said end heads having an inlet opening adapted to register successively with said chambers to admit a quantity of said bodies therein, means forming a steam manifold in one of said end heads to admit steam to said chambers as they pass beyond said inlet opening, means for admitting steam to said manifold at a pressure to raise the temperature of the subcutaneous moisture of said bodies in the chambers in communication therewith to approximately the temperature of said steam, a vent opening in the other of said end heads and registering with each chamber during the initial admission of steam therein, means for spraying water through one of said end heads into said chambers after passing beyond said manifold to condense said steam and create a vacuum therein to vaporize said subcutaneous moisture and to explode the skins from said bodies, and means for removing said bodies through an outlet opening provided in one of said end heads in immediate advance of said inlet opening.

4. Apparatus for peeling the bodies of vegetables and fruit of the character described, comprising a rotor rotating about a vertical axis and having a plurality of vertical tubular chambers extending axially therethrough and spaced an equal distance from said axis, means for rotating said rotor, a stationary end head at each end of said rotor and adapted to enclose said chambers, the upper end head having an inlet opening adapted to register successively with said chambers to admit, by gravity, a quantity of said bodies therein, means forming a steam manifold in the rotor side of said upper end head to admit steam to said chambers as they pass beyond said inlet opening, means for admitting steam to said manifold at a pressure to raise the temperature of the subcutaneous moisture of said bodies in the chambers in communication therewith to approximately the temperature of said steam, a vent opening in the lower of said end heads and registering with each chamber during the initial admission of steam therein, and means for spraying water through one of said end heads into said chambers after passing beyond said manifold to condense said steam and create a vacuum therein to vaporize said subcutaneous moisture and to explode the skins from said bodies, said lower end head being provided with an outlet opening immediately in advance of said inlet opening through which the peeled bodies in each chamber fall by gravity.

5. Apparatus for peeling the bodies of vegetables and fruit of the character described, comprising a rotor rotating about a vertical axis and having a plurality of vertical tubular chambers extending axially therethrough and spaced an equal distance from said axis, means for rotating said rotor, a stationary end head at each end of said rotor and adapted to enclose said chambers, the upper end head having an inlet opening adapted to register successively with said chambers to admit, by gravity, a quantity of said bodies therein, means forming a steam manifold in the rotor side of said upper end head to admit steam to said chambers as they pass beyond said inlet opening, means for admitting steam to said manifold at a pressure to raise the temperature of the subcutaneous moisture of said bodies in the chambers in communication therewith to approximately the temperature of said steam, a vent opening in the lower of said end heads and registering with each chamber during the initial admission of steam therein, and means for spraying water through said upper end head into said chambers after passing beyond said manifold to condense said steam and create a vacuum therein to vaporize said subcutaneous moisture and to explode the skins from said bodies, said lower end head being provided with an outlet opening immediately in advance of said inlet opening through which the peeled bodies in each chamber fall by gravity.

6. Apparatus for peeling the bodies of vegetables and fruit of the character described, comprising a rotor having a plurality of chambers in annular arrangement about the axis of said rotor and opening to the exterior thereof, a stationary structure fitted against said rotor and adapted to enclose said chambers, said stationary structure having an inlet opening adapted to register successively with said chambers to admit a quantity of said bodies therein, said stationary structure also having a steam inlet admitting steam to said chambers as they pass beyond said inlet opening, means for admitting steam to said steam inlet at a pressure to raise the temperature of the subcutaneous moisture of said bodies in the chambers in communication therewith to approximately the temperature of said steam, means for spraying water through said stationary structure successively into said chambers after passing said steam inlet to condense said steam and create a vacuum therein to vaporize said subcutaneous moisture and to explode the skins from said bodies, and means for removing said bodies through an outlet opening provided in said stationary structure in advance of said inlet opening.

7. Apparatus for peeling the bodies of vegetables and fruit of the character described, comprising a rotor having a plurality of chambers in annular arrangement about the axis of said rotor and opening to the exterior thereof, a stationary structure fitted against said rotor and adapted to enclose said chambers, said stationary structure having an inlet opening adapted to register successively with said chambers to admit a quantity of said bodies therein, said stationary structure also having a steam inlet admitting steam to said chambers as they pass beyond said inlet opening, means for admitting steam to said steam inlet at a pressure to raise the temperature of the subcutaneous moisture of said bodies in the chambers in communication therewith to approximately the temperature of said steam, said stationary structure also being provided with a vent opening registering with each chamber during the initial admission of steam therein, means for spraying water through said stationary structure successively into said chambers after passing said steam inlet to condense said steam and create a vacuum therein to vaporize said subcutaneous moisture and to explode the skins from said bodies, and means for removing said bodies through an outlet opening provided in said stationary structure in advance of said inlet opening.

8. Apparatus for peeling the bodies of vegetables and fruits, comprising a rotor having a plurality of chambers in annular arrangement about the axis of said rotor and opening to the exterior thereof, a stationary structure fitted against said rotor and adapted to enclose said chambers, means providing an inlet opening adapted to register successively with said chambers to admit a quantity of said bodies therein, steam inlet means admitting steam to said enclosed chambers as they pass beyond said inlet opening, means for admitting steam to said steam inlet means under pressure to raise the temperature of the subcutaneous moisture of said bodies in the chambers in communication therewith to approximately the temperature of said steam, means for spraying water successively into said enclosed chambers after passing said steam inlet means to condense said steam and create a vacuum therein to vaporize said subcutaneous moisture and to explode the skins from said bodies, and means for removing said bodies through an outlet opening provided in advance of said inlet opening.

9. Apparatus for peeling the bodies of vegetables and fruits, comprising a rotor having a plurality of chambers in annular arrangement about the axis of said rotor and opening to the exterior thereof, a stationary structure fitted against said rotor and adapted to enclose said chambers, means providing an inlet opening adapted to register successively with said chambers to admit a quantity of said bodies therein, steam inlet means admitting steam to said enclosed chambers as they pass beyond said inlet opening, means for admitting steam to said steam inlet means under pressure to raise the temperature of the subcutaneous moisture of said bodies in the chambers in communication therewith to approximately the temperature of said steam, means providing a vent opening registering with each enclosed chamber during the initial admission of steam therein, means for spraying water successively into said enclosed chambers after passing said steam inlet means to condense said steam and create a vacuum therein to vaporize said subcutaneous moisture and to explode the skins from said bodies, and means for removing said bodies through an outlet opening provided in advance of said inlet opening.

10. Apparatus for peeling the bodies of vegetables and fruit, comprising a rotor having a plurality of tubular chambers extending axially therethrough and spaced an equal distance from the axis thereof, a stationary end head at each end of said rotor and adapted to enclose said chambers, means for rotating said rotor, one of said end heads having an inlet opening adapted to register successively with said chambers to admit a quantity of said bodies therein, means for admitting steam to said enclosed chambers, after passing said inlet opening, under pressure to raise the temperature of the subcutaneous moisture of said bodies in the chambers in communication therewith to approximately the temperature of said steam, means for spraying water successively into said enclosed chambers after passing said steam admitting means to condense said steam and create a vacuum therein to vaporize said subcutaneous moisture and to explode the skins from said bodies, and means for removing said bodies through an outlet opening provided in one of said end heads in immediate advance of said inlet opening.

RUSSELL H. WINTERS.

REFERENCES CITED

The following references are of record in the file of this patent:

UNITED STATES PATENTS

| Number | Name | Date |
| --- | --- | --- |
| 1,910,749 | Chapman | May 23, 1933 |
| 1,243,724 | Fenn | Oct. 23, 1917 |
| 2,007,381 | Nicholoy | July 9, 1935 |
| 1,173,230 | Vaudreuil | Feb. 29, 1916 |
| 2,024,344 | Eberts et al. | Dec. 17, 1935 |
| 1,445,742 | Blair | Feb. 20, 1923 |